Feb. 11, 1930.                S. R. C. SMITH                1,746,874
                        MECHANICAL LOADING SHOVEL
                            Filed May 3, 1929
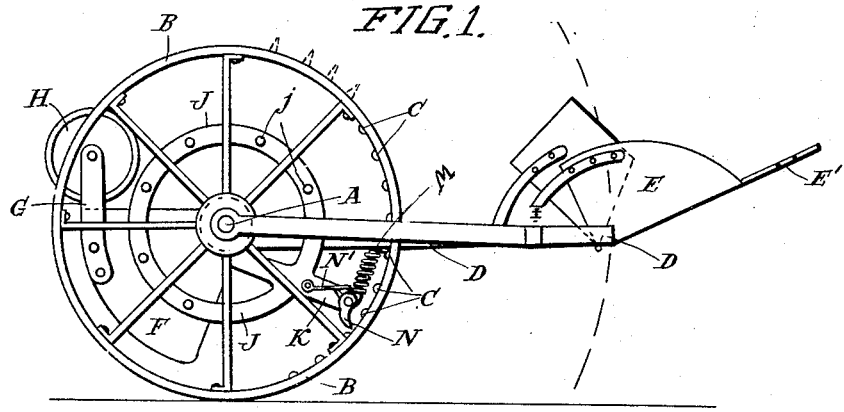
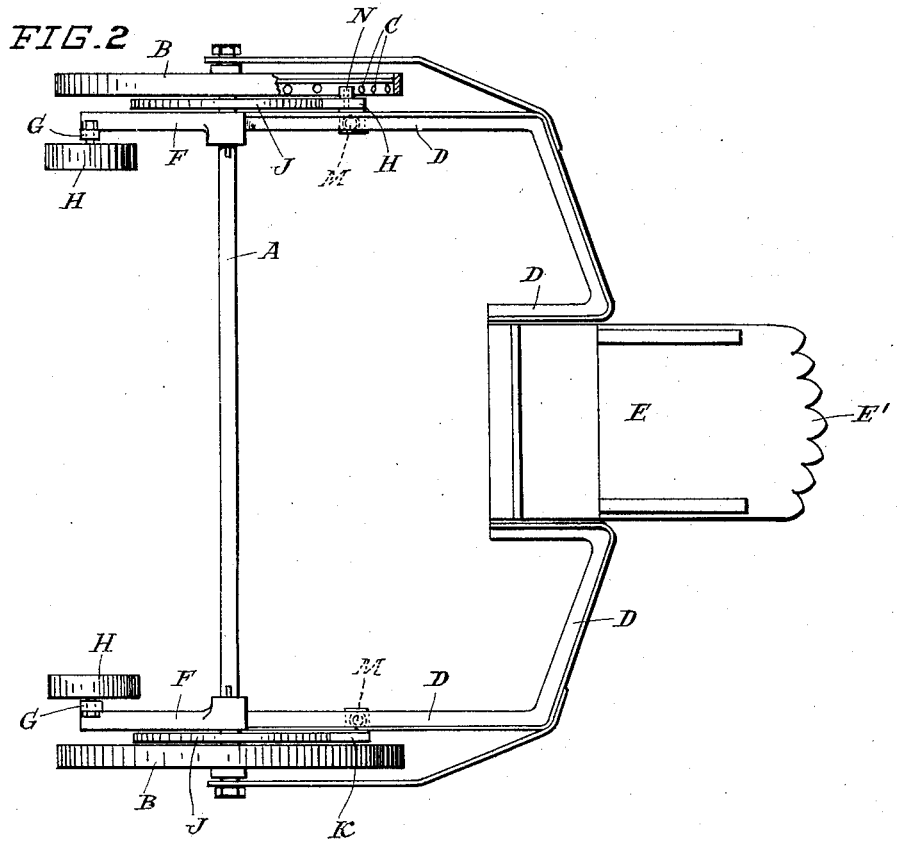

Patented Feb. 11, 1930

1,746,874

UNITED STATES PATENT OFFICE

SEPTIMUS REGINALD CHOLMONDELEY SMITH, OF ONEROA, AUCKLAND, NEW ZEALAND

MECHANICAL LOADING SHOVEL

Application filed May 3, 1929, Serial No. 360,052, and in New Zealand April 14, 1928.

This invention provides for improvements in the construction of a mechanical loader designed for use in loading gravel, road forming materials, or like matter into a truck.

The invention relates to that known class of loader that comprises a shovel device that is carried on the end of a pivoted tipping frame and is, in operation, designed to load the shovel by forcing it into the mass of material, and then by tipping the frame up and over, to cause the loaded shovel to deposit its contents into a truck arranged in the necessarily convenient position to receive them.

The invention consists in improvements in the construction of such a type of apparatus by the use of which the loader by its connection to the truck may by the backing of the truck, have its shovel lowered and driven into the mass of material to be removed, and then by the forward travel of the truck, will have its shovel lifted and turned over in the desired manner, to deposit its contents into the said truck.

In fully describing the invention, reference will be made to the accompanying sheet of drawings, in which:—

Figure 1 is a side elevation of the machine, with the shovel in a normal position ready for commencing operations.

Figure 2 is a plan thereof, part being in section.

In this invention an axle A is provided and is mounted on carrying wheels B, arranged loosely on the axle, one at each of its ends. If desired these wheels may be furnished with ground grips or spikes all round their peripheries, some of these being shown by dotted lines in Figure 1. Each wheel has a rim made of plate ring form and on the inner periphery is provided with a series of studs C affixed thereto, at regular intervals apart all round. These studs are arranged near the inner edge of the rim and clear of the wheel's spokes.

A frame is provided composed of two side members D fixed on the axle A near its respective ends, and extending in parallel lines rearwardly for a distance where they converge and support between their rear ends, the shovel E. This is made of ordinary scoop nature having a bottom projecting rearwardly as at E′ and made with points across its rear edge, as shown in Figure 2. The shovel-scoop is fitted between the frame members D at such an angle as will provide for it being approximately horizontal when such members are turned down at their rear ends, while provision may be made for varying such angle at will.

Each of the frame members D is provided with a forward extension F which is made of a weight such as to act as a counterweight to the rear end of the frame and its shovel-scoop, and to hold such end approximately horizontal under normal circumstances. Each of these weight extensions has an upwardly extending arm G affixed to it and in the upper end of such arm, a pulley wheel H is mounted on an axis parallel with that of the axle A. This wheel H is of such a diameter that its periphery extends outside the circumference of the wheel B for a suitable distance necessary for the performance of the function hereinafter described.

Mounted on each end of the axle, between each frame member D and wheel B is an annular ring J of approved diameter that is attached to a collar loosely mounted on the axle. This ring is provided with an arm K extending radially outward therefrom on the outer end of which a spring cushion M is mounted. The spring cushion extends between the arm end and the frame member D on that side, so that the frame is thus supported on these springs. To the outer end of each arm a pawl N is pivoted and is spring controlled by the spring N′ to bear outwards upon the inner periphery of the rim of the wheel A in the line of the studs C so that its point is adapted to engage one of the studs and thus to support the arm and ring and through them the frame member D on the corresponding side. The ring J is made with a number of holes $j$ each one of which is designed to receive a pin that projects inwardly for a distance.

In operation, the parts being in the normal position as shown in Figure 1, on the appliance being backed, the wheels turn rearwardly and thereby allow the frame to be lowered with the turn of the wheels until the shovel engages the ground. On further backing the pins $j$ engage the frame D and thereby prevent the rings J from moving around any further with the wheels, and allows the wheels to travel on to back the shovel into the material to be lifted, the pawls N running idly over the studs C. On the appliance being drawn forwardly, the pawls N will immediately be engaged by studs so that on the forward rotation of the wheels the rings J will turn with them causing the frame D through the springs M to be lifted, turning with the axle right up and over to discharge the contents from the shovel-scoop. The hole in the ring J in which the engaging pin is placed determines, by its distance from the arm K, the amount the ring will move with the backing of the wheels after the shovel engages the ground, and consequently also the distance the shovel will be drawn forwardly to free the mass from the pile of material, before the frame D to which it is attached comences to lift. As the outer end of the frame passes the top of its travel, the wheels H come into contact with the ground and take the weight and travel of the appliance so that no further turning of the frame can take place because of the counterweights F being below the axle. These counterweights then act to turn the frame back again with the wheels B, to their normal positions, the cushion springs M taking the jar of the falling frame.

The truck connection with the appliance is made in any approved manner such as will provide for the movements of the truck being communicated to the appliance and for the truck being in the proper position to receive the matter discharged from the shovel-scoop.

I claim:—

1. In mechanical loading shovel appliances, the combination with an axle and a tipping frame fixed thereon to extend radially and having the shovel mounted in its outer end, of carrying wheels loosely journalled on such axle, one near each end, and each of which is provided with studs or teeth on the inner surface of its peripheral rim, an annular ring loosely mounted on each end of the axle between the said frame and carrying wheel at that end, and a pawl pivoted on the said ring and engaging the inner surface of the adjacent carrying wheel in the line of the said studs or teeth, substantially as specified.

2. In mechanical loading shovel appliances, according to claim 1, forming the said annular ring with apertures in it at intervals apart around its circumferences, and a pin adapted to fit into any of such apertures and to project above the line of the tipping frame on that side, substantially as and for the purposes specified.

3. In mechanical loading shovel appliances according to claim 1, the combination with the said tipping frame, of counterweights therefor, one near each end of the axle, each of which counterweights has a pulley wheel mounted thereon, on an axis parallel with the axle and so disposed that its periphery projects outside the rim of the carying wheel, substantially as and for the purposes specified.

4. In mechanical loading shovel apliances according to claim 1, the combination with the said ring of an arm affixed thereto to extend below the said frame and a spring, in compression, arranged between the outer end of the lever and the frame, substantially as and for the purposes specified.

In testimony whereof, I affix my signature.

SEPTIMUS REGINALD CHOLMONDELEY SMITH.